April 5, 1927.
B. F. B. SEWELL
TRACTOR ATTACHMENT
Filed April 1, 1925
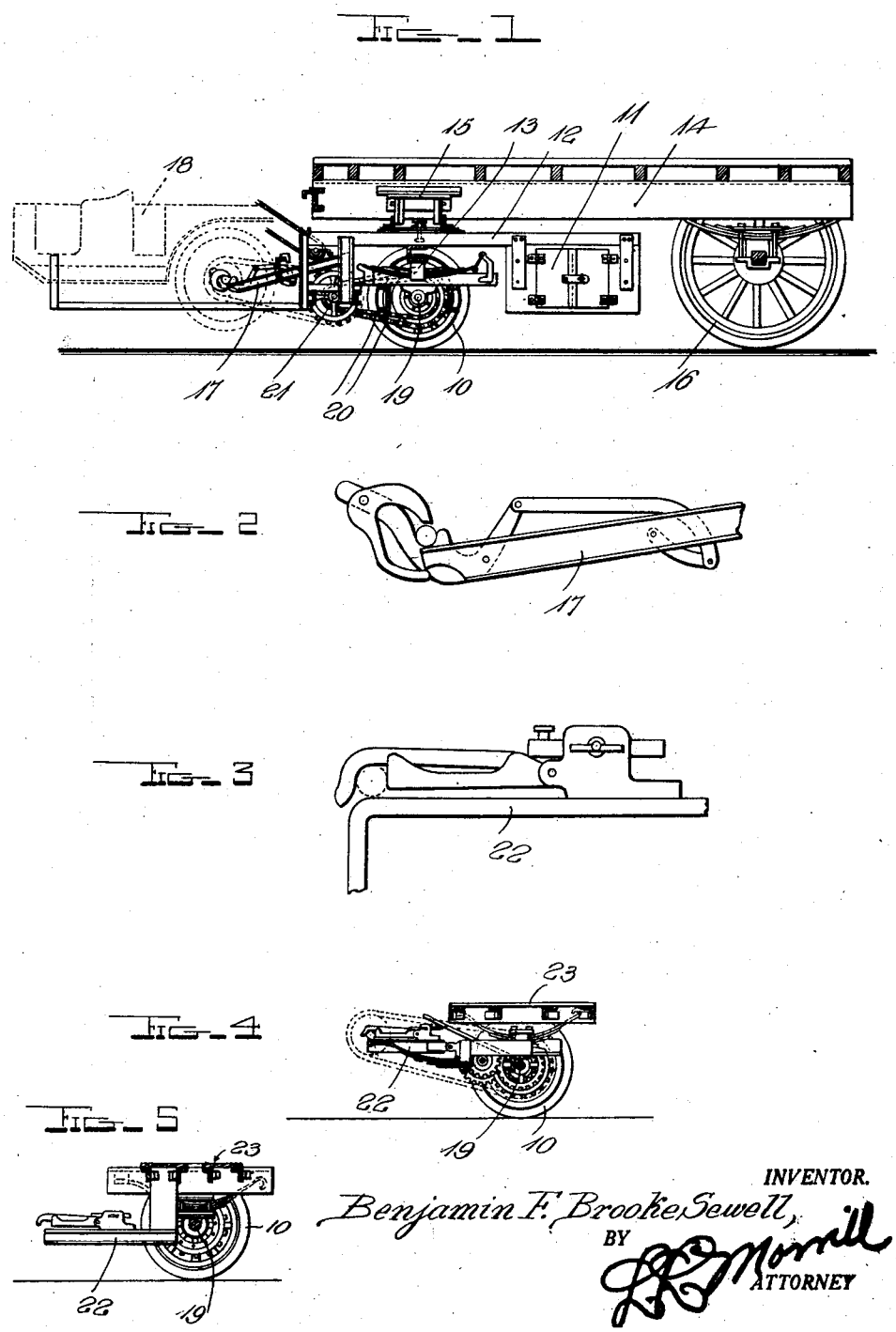
INVENTOR.
Benjamin F. Brooke Sewell,
BY
ATTORNEY Patented Apr. 5, 1927.

1,623,815

UNITED STATES PATENT OFFICE.

BENJAMIN F. BROOKE SEWELL, OF CHULA, VIRGINIA.

TRACTOR ATTACHMENT.

Application filed April 1, 1925. Serial No. 19,901.

This invention relates to tractor attachments for automotive vehicles, and one of the objects of the invention is to provide a pair of traction wheels to which power is conveyed from a power plant forming a part of an automotive vehicle, the said wheels operating as a fulcrum for the support of the automotive vehicle in front of said traction wheels, a counterweight of some kind being employed in the rear of said wheels to maintain the automotive vehicle suspended from the ground.

A further object of the invention is to provide a pair of traction wheels having a body extending rearwardly therefrom and preferably provided with a pair of rear wheels for supporting the rear end of said body with forwardly extending means for engaging and supporting the rear of an automotive vehicle clear of the ground with further means for transmitting power from the suspended automotive vehicle to said traction wheels.

With these and other objects in view, the invention comprises certain novel parts, elements, units, combinations, mechanical movements, constructions, interactions and functions, as disclosed in the drawings together with mechanical and functional equivalents thereof as will be hereinafter more fully described and claimed.

In the drawings:

Figure 1 is a view partially in side elevation and partly in vertical longitudinal section of the improved tractor attachment showing an automotive vehicle in dotted lines.

Figure 2 is one type of attachment means for connecting the tractor to the automotive vehicle.

Figure 3 is a view in elevation of another type of connecting means for attaching the tractor attachment to the automotive vehicle.

Figures 4 and 5 are modifications of the traction element shown in vertical section.

Like characters of reference indicate corresponding parts throughout the several views.

The improved tractor attachment which forms the subject matter of this application comprises a unit supported upon a pair of traction wheels, one of which is shown at 10, the other being removed to disclose the structural features. Upon this traction unit a counter weight is provided. At Figure 1, two counter-weights are provided, one being a freight-carrying compartment 11 attached to the rear end of a bar or platform 12 which is rigidly secured to the bolster 13 of the traction unit. A further counter-weight is provided in the body 14 which is attached to the traction unit by means of a fifth wheel attachment indicated at 15 whereby the body 14 supported at its rear end upon the wheels 16 is free to swing about this fifth wheel permitting turning.

At the front of the traction unit means indicated at 17 is provided for attaching to an automotive vehicle indicated in dotted lines at 18. This means of attaching the tractor attachment to the automotive vehicle is fully described and claimed in the original application and is merely disclosed here to show a complete operative unit.

The traction wheels 10 are, of course, mounted upon an axle 19 driven from one or more sprocket chains 20 from a shaft 21 which in turn receives power from the rear axle or wheel of the automotive vehicle 18. The manner of transmitting power to this tractor unit is also described and claimed in the original application.

A modification of the attaching means is shown at 22 in Figure 3, which modification is also shown in the original application and may be alternatively used with the attaching means 17.

At Figures 4 and 5, a platform 23 is built upon the traction unit upon which is or may be pivoted the body 14 without employing the bars 12 or counter-weight 11, said body serving wholly as the counter-weight, eliminating the counter-weight shown at Figure 1. At said Figures 4 and 5 the attaching means shown at Figure 3 is shown, but it is to be understood that the two attaching means are alternative and both are described in the original application and form no part of the present invention except as they enter into a complete unit.

In operation, the traction unit is supported from tilting by the counter-weights, either the body 14 alone or in conjunction with the counter-weight 11 whereby the forwardly extending connecting members are capable of supporting an automotive vehicle with the rear lifted from the ground so that power may be taken from the suspended wheels or axle and transmitted to the traction unit without employing other means for supporting the vehicle, the traction unit serving as a fulcrum for not only applying the power but supporting the rear of the vehicle and the front of the load.

What I claim to be new is:

1. A tractor attachment for motor vehicles, comprising a traction unit embodying a pair of wheels, a lever mounted upon said wheels as a fulcrum, the front of said lever supporting and raising the rear of an automotive vehicle from the ground, the rear of said lever supporting a counter-weight for lifting and supporting said vehicle, and means for transmitting power from the suspended vehicle to drive said traction unit.

2. A tractor attachment for motor vehicles, comprising a traction unit embodying a pair of wheels, a lever mounted upon said wheels as a fulcrum, the front of said lever supporting and raising the rear of an automotive vehicle from the ground, the rear of said lever supporting a counterweight for lifting and supporting said vehicle, said counterweight comprising in part a pair of wheels, and means for transmitting power from the suspended vehicle to drive said traction unit.

3. A tractor attachment for motor vehicles, comprising a traction unit embodying a pair of wheels, a lever mounted upon said wheels as a fulcrum, the front of said lever supporting and raising the rear of an automotive vehicle from the ground, the rear of said lever supporting a counterweight for lifting and supporting said vehicle, said counterweight comprising in part a pair of wheels, a body connected with the wheels, and means for transmitting power from the suspended vehicle to drive said traction unit.

In testimony whereof I affix my signature.

BENJAMIN F. BROOKE SEWELL.